United States Patent [19]
Christopher

[11] Patent Number: 5,412,436
[45] Date of Patent: May 2, 1995

[54] MOTION ADAPTIVE VIDEO PROCESSING SYSTEM

[75] Inventor: Todd J. Christopher, Indianapolis, Ind.

[73] Assignee: Thomson Consumer Electronics, Inc., Indianapolis, Ind.

[21] Appl. No.: 51,738

[22] Filed: Apr. 22, 1993

[51] Int. Cl.⁶ ............................................. H04N 7/18
[52] U.S. Cl. .................................... 348/700; 348/701
[58] Field of Search ............................... 348/699–702, 348/452, 607, 620; H04N 7/18

[56] References Cited

U.S. PATENT DOCUMENTS

| | | | |
|---|---|---|---|
| 4,598,309 | 7/1986 | Casey | 358/11 |
| 4,639,783 | 1/1987 | Fling | 358/166 |
| 4,639,784 | 1/1987 | Fling | 358/167 |
| 4,682,230 | 7/1987 | Perlman et al. | 358/167 |
| 4,703,358 | 10/1987 | Flannaghan | 348/700 |
| 4,716,462 | 12/1987 | Wargo et al. | 358/166 |
| 4,730,217 | 3/1988 | Tonge et al. | 348/700 X |
| 4,731,648 | 3/1988 | Bernard et al. | 348/700 X |
| 4,933,978 | 6/1990 | Perlman et al. | 382/41 |
| 5,046,164 | 9/1991 | Hurst, Jr. | 358/140 |
| 5,081,532 | 1/1992 | Rabii | 348/700 X |
| 5,166,788 | 11/1992 | Lee | 348/699 |

FOREIGN PATENT DOCUMENTS

| | | | |
|---|---|---|---|
| 0236519 | 9/1987 | European Pat. Off. | H04N 5/14 |
| 0361558 | 4/1990 | European Pat. Off. | H04N 5/44 |
| 0418709 | 3/1991 | European Pat. Off. | H04N 5/44 |
| 2114396 | 8/1983 | United Kingdom | H04N 5/02 |
| 8502080 | 5/1985 | WIPO | H04N 5/14 |

OTHER PUBLICATIONS

IEEE Transactions on Consumer Electronics, 1989, "Comparison Between Median Filtering and Vertical Edge Controlled Interpolation for Flicker Reduction" by Hentschel, pp. 279–289.

*Primary Examiner*—Victor R. Kostak
*Attorney, Agent, or Firm*—Joseph S. Tripoli; Peter M. Emanuel; Richard G. Coalter

[57] ABSTRACT

A video source provides a temporally interpolated video signal, a spatially interpolated video signal and a motion indicating signal. A difference signal, derived from the temporally and spatially interpolated signals, is symmetrically limited as a function of the motion signal amplitude and then combined with the temporally interpolated signal to form a motion adapted video output signal having (1) reduced motion artifacts such as smearing and loss of fine detail; (2) reduced noise sensitivity; and (3) enhanced low-contrast motion rendition.

13 Claims, 3 Drawing Sheets

MOTION ADAPTIVE VIDEO PROCESSING SYSTEM

FIELD OF THE INVENTION

This invention relates generally to television apparatus and particularly to motion adaptive video signal processing systems.

BACKGROUND OF THE INVENTION

Motion adaptive video signal processing systems are useful in a variety of applications. Examples of such uses include interlace-to-progressive scan converters, standards converters, luminance and chrominance signal separators and the like. In such systems a motion signal is generated and used to control a parameter of the processed video signal such as, for example, the selection, mixing or blending of two or more processed video signals so as to produce a combined signal in which visual artifacts due to scene motion are reduced.

In a typical application, motion is detected by measuring the difference in the (luminance) signal level of corresponding pixels (picture elements) on successive video frames. The absolute value of this difference produces an estimate of the presence and amount of motion at that position of the image. Unfortunately, the value of the frame difference signal at a given picture location is also dependent on the amount of contrast. As the contrast decreases the value of the frame difference decreases also. In order to ensure that low contrast moving pixels are detectable as well as higher contrast moving pixels, it is conventional practice to compensate for contrast variations by limiting the frame difference signal to a relatively narrow range of values.

Typically, the absolute value of the frame difference signal is "clipped" or limited to a relatively small amplitude (e.g., 7 quantization steps) which is then considered to represent full motion. Since the motion signal thus produced has only 7 quantization levels, it can be represented by a relatively small word size (e.g., 3 bits) and so memory storage requirements for the motion signal are relatively modest as compared with storage of a "full resolution" (e.g., 255 levels, 8 bits) motion signal.

After motion signal generation and compensation for contrast variations as noted above, it is conventional practice to additionally subject the motion signal to motion "spreading" in a motion signal processor. The term "spreading" refers to the process of adding to the motion signal motion samples from pixels surrounding the pixel being interpolated. In a sense, this process "spreads" or "expands" the motion detection area so as to be larger than the particular pixel whose motion is being measured. The advantage of including a larger number of pixels in the motion determination is that the probability of detecting moving pixels is greatly increased because of the increased motion detection "aperture" or "window" produced by "spreading" the motion signal.

In practice, motion signal spreading may be either temporal or spatial. Temporal spreading is obtained by including effects of motion signals of preceding fields and/or following fields. Spatial spreading may be realized by including the effects of motion signals of preceding and/or following motion samples either vertically (line by line) and/or horizontally (pixel by pixel). Also, one may "spread" the motion signal by combining both temporal and spatial (horizontal and/or vertical) spreading components.

As noted above, the motion signal processing spreads the motion signal temporally and/or spatially to take advantage of surrounding motion information. This reduces the probability that movement will be missed in the case, for example, where corresponding pixels of successive frames happen to have the same signal value, even though they represent different portions of a moving object.

After motion signal spreading, the final processing step in the conventional motion adaptive video processing system is to generate temporally and spatially interpolated video signals and combine them with the aid of the processed motion signal. One way the combining may be done is by applying the processed motion signal to the control input of what is commonly called a "soft switch" or "fader" circuit. The temporally averaged and the spatially averaged video signals are applied to respective signal inputs of the "soft switch". Under the control of the motion signal, the soft switch selects the temporally interpolated signal when the motion signal is low (indicating a stationary image area) and selects the spatially interpolated signal when the motion signal is high (indicating a moving image area). For motion signal values in-between low and high, the soft switch "blends" or proportionally combines the spatially and temporally signals to form the video output signal. This "blending" provides a smooth transition between spatial and temporal signal selections and so reduces the tendency for visual artifacts to be produced during changeover from one interpolated signal to another.

FIG. 1 exemplifies a typical embodiment of the above-described system. An input signal Yin to be interpolated is applied to a frame memory comprising a cascade connection of a 262H delay 10, a 1-H delay 12 and another 262H delay 14. An averager 16 averages the 1-H signals to provide a spatially interpolated signal YS which represents an average of pixels on lines above and below the location of the pixel to be estimated. Another averager 18 averages the frame and un-delayed signals to provide a temporally interpolated signal YT. This signal represents the average of corresponding pixels of the prior field and a subsequent field. For stationary regions the temporally interpolated signal YT gives the best estimate of the value of the output signal Yest. For moving portions of an image it is necessary to use the spatially interpolated signal YS to avoid motion artifacts.

Signal selection is provided by a soft switch 20 comprising a subtractor 22 that subtracts YT from YS, a multiplier 24 that multiplies the subtractor difference by a motion signal MOT and an adder 26 that adds signal YT to the multiplier output to produce the estimated or interpolated video output signal Yest. The motion signal MOT is produced by a subtraction and absolute value circuit 28 which subtracts the input and frame delayed signals and takes the absolute value of the difference to produce a basic motion indicating signal which is then applied to a motion signal processor 30 that may add processing such as motion spreading and outputs the processed motion signal MOT.

The scaling of the multiplier in the soft switch is such that when the motion signal MOT represents maximum motion, the signal YS—YT is passed with unity gain and consequently the YT signal is then cancelled in the adder and the output signal Yest equals YS. Conversely, for stationary areas the motion signal MOT is zero and so the output estimated signal becomes the temporally interpolated signal YT. For motion between zero and full motion the output signal is a proportional blend of the temporally and spatially estimated signals YT and YS.

The system of FIG. 1, while effective for high quality video input signals, suffers from sensitivity to noise for lesser quality signals and especially so for stationary images. For a stationary signal, such as a test pattern with additive noise, a high contrast horizontally oriented edge can result in a large difference between the values of YT and YS. At the same time, relatively low levels of noise will cause significant fluctuations in the motion signal MOT. The estimated signal Yest, and thus the image, will noticeably fluctuate in an undesired manner at such an edge. A further problem is that low contrast moving images may not produce a full motion signal. In this case, the soft switch will then allow some of the temporal average signal YT to pass, resulting in smearing and loss of fine detail.

In an effort to overcome the problems of conventional motion compensated systems, it has been proposed to use a different form of processing which does not employ motion signal detection and processing. One such approach is described by Hurst, Jr. in U.S. Pat. No. 5,046,164 entitled INTERSTITIAL LINE GENERATOR FOR AN INTERLACE TO NON-INTERLACE SCAN CONVERTER which issued Sep. 3, 1991. The Hurst, Jr. apparatus makes use of median filtering principles for spatial/temporal signal selection. In median filtering, plural video signal are compared and the signal having a median value is selected as an output. In the Hurst, Jr. system, a delay circuit provides plural video lines disposed about the location of the interstitial line to be generated. Comparison circuitry compares the relative values of the delayed video signals. The signals exhibiting maximum and minimum extremes are eliminated and the remaining signals are combined in predetermined proportions to provide a resultant interstitial line.

The Hurst, Jr. system is elegantly simple and remarkably effective. The median filters have some very desirable characteristics for this application. One useful property is that of continuity; e.g., continuously changing inputs produce continuously changing outputs. This eliminates the need for soft switches, which are normally used in motion adaptive systems to avoid artificially abrupt changes. Another valuable property is that the gain is limited to unity; i.e., a change in any input never produces a larger change in the output. This latter property gives median filtering systems very good immunity to noise, since the effects of the noise can never exceed the value of the noise.

One disadvantage of such systems lies in the inability of the median filter system to perform any kind of motion "spreading", since there is no explicit motion signal in the system. Lacking this capability, the non-motion adaptive systems may miss-interpolate pixels for certain types of motion (e.g., diagonal motion which results in no change in luminance level at a particular pixel location).

SUMMARY OF THE INVENTION

A motion adaptive video processing system embodying the invention comprises a video source for providing a temporally interpolated video signal YT, a spatially interpolated video signal YS and a motion indicating signal M. Circuit means are provided for forming a difference signal from said temporally and spatially interpolated signals, for symmetrically limiting the difference signal in accordance with the motion signal MOT and for combining the resultant signal with the temporally interpolated signal to form a motion adapted video output signal.

In an advantageous application of the principles of the invention, the symmetrical limitation of the difference signal is provided by a median filter.

In accordance with a further application of the principles of the invention, the advantage of temporal motion spreading is achieved for high resolution motion signals with only modest memory requirements by subjecting the motion signal to sub-sampling before it is subjected to temporal motion spreading.

A method, according to the invention, for forming a motion compensated video signal, comprises providing a temporally interpolated video signal YT, a spatially interpolated video signal YS and a motion indicating signal MOT; forming a difference signal from the temporally and spatially interpolated signals; symmetrically limiting the difference signal in accordance with the motion signal MOT to form a symmetrically limited difference signal; and combining the symmetrically limited difference signal with the temporally interpolated signal to form a motion adapted video output signal.

In an advantageous application of the method of the invention, the step of symmetrically limiting said difference signal comprises:

applying the difference signal to a first input of a median filter;

applying the motion signal to a second input of said median filter;

inverting the motion signal to form the negative of the motion signal;

and applying the inverted motion signal to a third input of said median filter.

In another advantageous application of the method of the invention there is a further step of applying sub-sampling and temporal spreading to the motion signal with the sub-sampling being applied prior to application of the temporal spreading.

BRIEF DESCRIPTION OF THE DRAWING

The foregoing and further features of the invention are illustrated in the accompanying drawing wherein.

DETAILED DESCRIPTION

Figure 2:
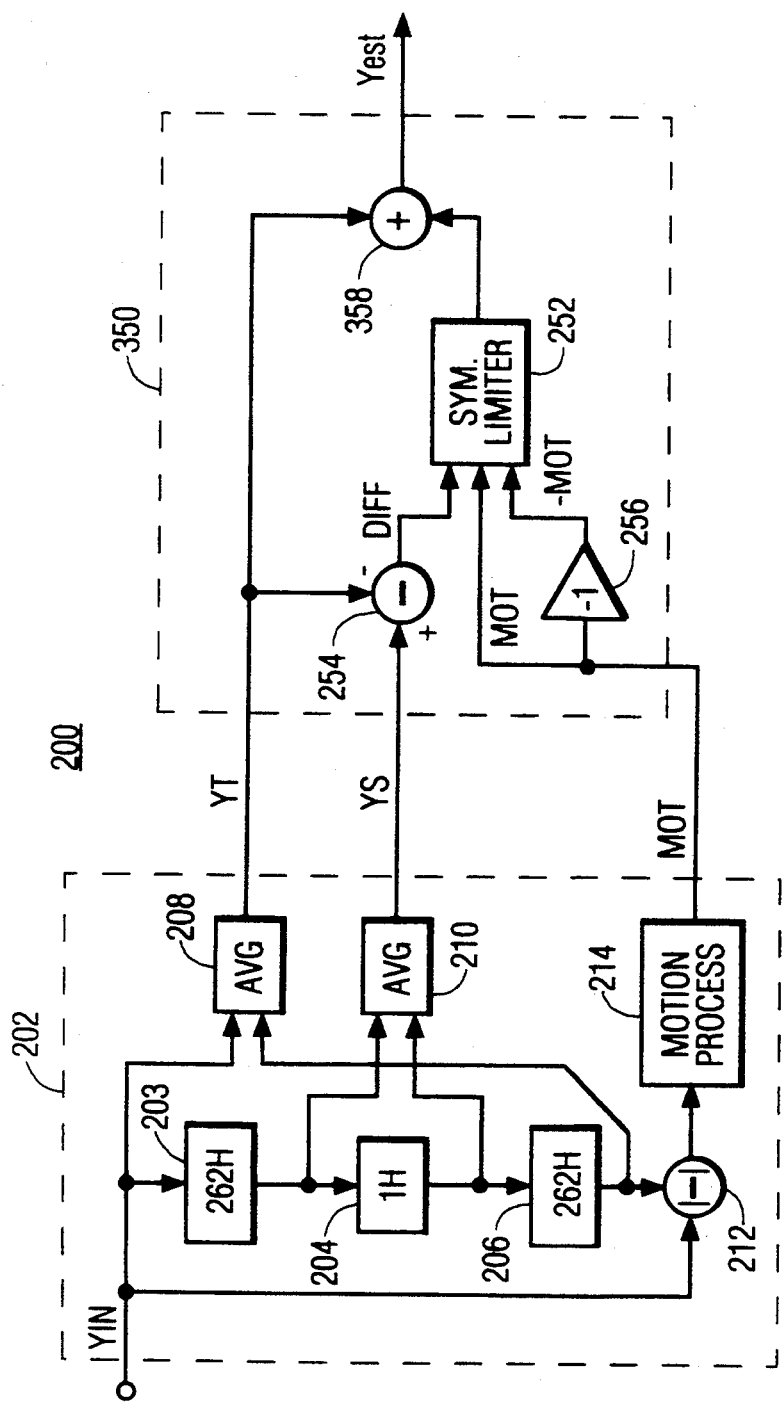
FIG. 2 is a block diagram of a motion adaptive video processing system embodying the invention.

As an overview of some of the more salient features of the invention, the motion adaptive system 200 of FIG. 2 includes a video source 202 (outlined in phantom) that provides a temporally interpolated video signal YT, a spatially interpolated video signal YS and a motion indicating signal MOT. A selection circuit or output signal forming circuit 250 (outlined in phantom) is provided for forming a difference signal DIFF from the temporally and spatially interpolated signals YT and YF. A symmetrical limiter 252 is provided for symmetrically limiting or "clipping" the difference signal DIFF in accordance with the motion signal M and for adding the resultant signal to the temporally interpolated signal YT to form a motion adapted video output signal Yest.

Advantageously, the use of motion controlled symmetrical limiting (which may be provided, for example, by a median filter) has beneficial effects including, illustratively, (1) reduced motion artifacts (2) relative insensitivity to noise and (3) good low-contrast motion rendition.

In more detail, the video source 202 of the motion adaptive video signal processing system 200 of FIG. 2 includes a tapped frame memory comprising a cascade connection of a 262H delay element 203, a one line (1-H) delay element 204 and another 262H delay element 206. The luminance input signal Yin is applied to the cascade connection and the temporally interpolated output signal YT is produced by an averager 208 which averages the input signal and the frame delayed (525H) signal produced at the output of delay element 206. The spatially interpolated signal YS is produced by an averager 210 which averages the 262H and the 263H delayed signals at the outputs of delay elements 202 and 204, respectively.

The motion indicating signal MOT is generated by a subtractor and absolute value circuit 212 which takes the difference between the input signal Yin and the frame delayed output (525H) signal produced by delay element 206 and then takes the absolute value of the difference signal. This "rectified", so to speak, signal is indicative of motion and is applied to a motion processor 214 which may provide such functions as vertical, horizontal, diagonal or temporal motion signal "spreading" or combinations of the various spreading functions.

Vertical motion spreading may be implemented by averaging motion data vertically. Both vertical and horizontal spreading may be implemented by averaging motion data from an array of pixels of a given field. Temporal motion spreading may be implemented by averaging motion data over two or more fields. Advantageously, the use of motion spreading tends to reduce motion errors by involving a larger number of motion data in the motion estimate.

In the system of FIG. 2 the motion signal MOT is not compressed to a few bits as in conventional motion adaptive but is maintained at a full (e.g., 8-bit) resolution. This represents a significant advantage over the conventional motion adaptive systems previously discussed which were limited to only two or three bits of resolution because of the effect of low contrast motion. The higher resolution effectively reduces visible artifacts in scenes having stationary and moving objects. This is possible because in the present system the motion signal MOT is not used for operating a switch as in the prior systems but rather is used to set and control the limits of a symmetrical limiter circuit 252.

In more detail, the difference signal (YS−YT) provided by subtractor 254 is applied to the symmetrical limiter 252 the other inputs of which receive the motion signal MOT and the negative (inverse) of the motion signal −MOT (provided by inverter 256). Thus, instead of (YS−YT) being multiplied by the motion signal, as in the conventional systems previously discussed, the difference signal (YS−YT) is symmetrically limited or "clipped" at levels corresponding to +MOT and −MOT. The interpolated or "estimated" luminance output signal Yest is then formed by an adder 258 which combines the temporally interpolated signal YT with the output of the symmetrical limiter 252.

Figure 1:
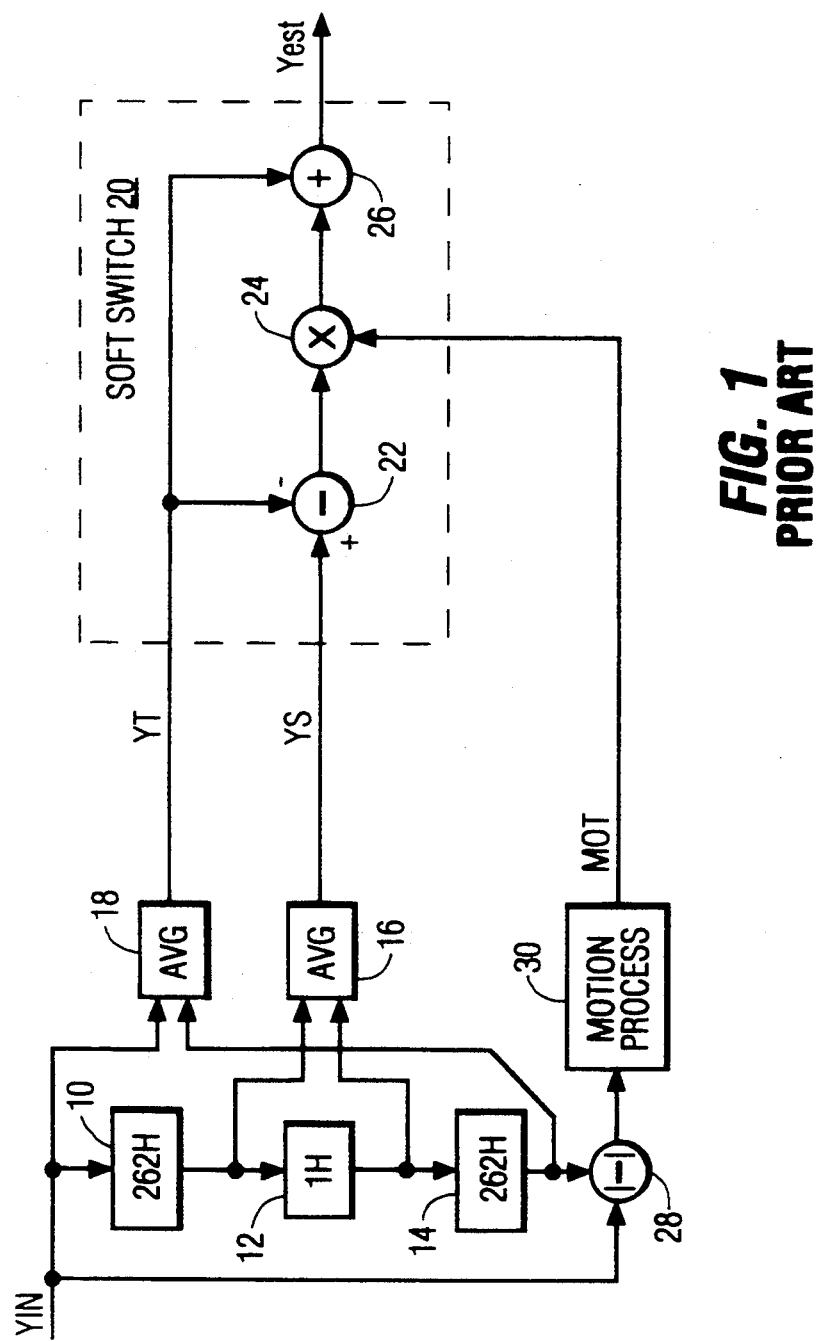
FIG. 1 is a block diagram of a conventional motion adaptive video processing system.

Since the motion signal MOT is derived from the frame difference signal, it will be large in the case of high contrast motion and small for low contrast motion. In either case, when motion is present the motion signal MOT will be larger than the magnitude of the difference signal YS−YT and no limiting or clipping will occur. In this configuration the symmetrical limiter exhibits a unity gain characteristic so that noise on the signal which causes fluctuations in the motion signal MOT will cause fluctuations in the output signal Yest which are no greater than the noise. Thus, the system combines the reduced motion artifacts of the conventional motion compensated system (e.g., FIG. 1) with the insensitivity to noise and good low-contrast motion rendition provided by the median filtering type of interpolation systems.

In the system of FIG. 2 there is some hardware complexity increase due to the increased word length (8-bits full resolution) of the motion signal MOT. However, this is compensated for to some extent by the relatively simplicity of the symmetrical limiter as compared to a multiplier. Physically, the symmetrical limiter may be implemented as a three-input median filter. Normally, a general 3-input median filter requires that all three pair-wise comparisons (e.g., comparisons taken two at a time) of the three inputs be performed to determine which input to select. Advantageously, it is a feature of the illustrated embodiment that it is not necessary to perform three pair of comparisons to implement a median filter suitable for use as symmetrical limiter 252. This is because in the example of FIG. 2 (and also FIG. 3) it is known that one of the inputs (+MOT) will always be greater than another of the inputs (−MOT) and so only two comparisons are required to determine the output.

Figure 3:
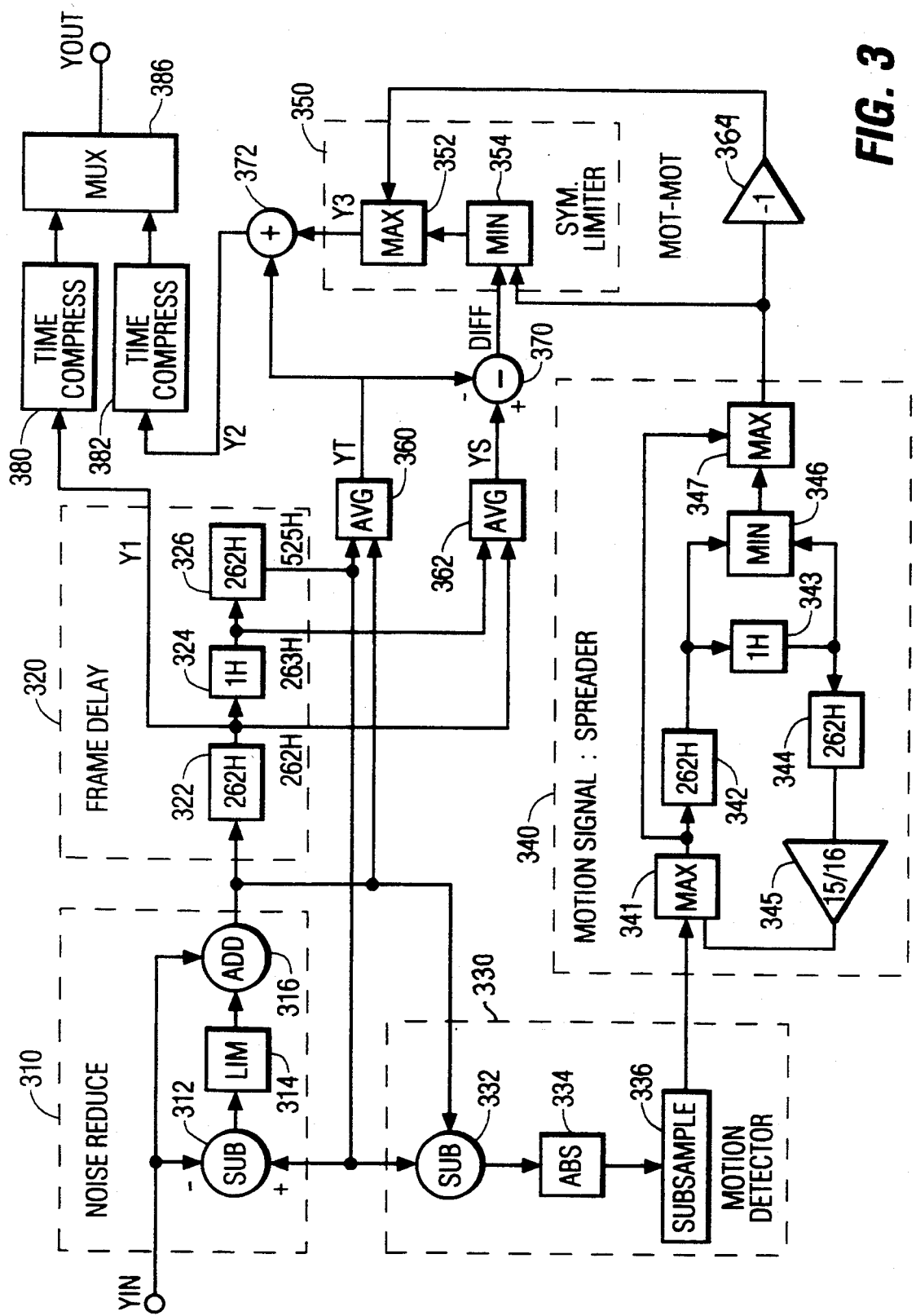
FIG. 3 is a block diagram of a motion adaptive progressive scan conversion system embodying the invention.

An advantageous implementation of the symmetrical limiter 252 of FIG. 2 is illustrated in FIG. 3 by the circuitry 350 (outlined in phantom). This implementation functions as a three-input median filter but it requires only two comparisons rather than three comparisons normally needed for a three input median filter. The transfer function may be expressed as follows:

$$Yout = \text{Max}[-MOT, \text{Min}(YS-YT, +MOt)] \quad (1)$$

This relationship indicates that the value of the symmetrically limited or median filtered luminance signal Yout is equal to the larger (Max) of the negative of the motion signal (−MOT) and the smaller (Min) of the motion signal +MOT and the difference signal YS−YT. In FIG. 3 this function is implemented by means of the combination of a minimum value selector 354 which selects the minimum of the difference signal YS−YT and the motion signal MOT and a maximum value detector 352 which selects the larger of the inverted motion signal (−MOT) and the result of the minimum value selection.

The motion adaptive processing system 200 of FIG. 2 is of general utility. It may be used, for example, in interlace to non-interlace (e.g., progressive scan) converters, in standards converters (e.g., NTSC/PAL), in line or field rate doublers, in luminance/chrominance signal separators and other such applications. The example of FIG. 3 is exemplary of use of the system in a progressive scan converter.

In FIG. 3 the progressive scan converter includes a frame memory 320 (outlined in phantom) comprising a cascade connection of a 262H delay memory 322 a 1-H delay memory 324 and another 262H delay memory 326 to thereby provide video output signals delayed by 262H, 263H and a full frame 525H. It will be appreciated that these delays are for NTSC standard signals. For other systems appropriate delays would be used. In the PAL system, for example, there are 625 lines per frame. Accordingly, in such a system the delays would be selected to be 312H, 1H and 312H giving net delays of 312H, 313H and 625H.

The video input signal Yin, to be converted to progressive scan form, is applied to the frame delay memory 320 by means of a noise reduction circuit 310 (outlined in phantom). The frame memory provides all delays needed for spatial and temporal interpolations of the video input signal. The noise reduction circuit, in combination with the frame delay circuit, provides temporal (frame) recursive filtering of the input signal and all of the delayed output signals. Noise reducer 310 comprises a subtractor 312 which subtracts the input signal Yin from the frame delayed signal Y525. The resultant difference signal is limited by a limiter 314 and then added to the input signal in adder 316 to provide a noise reduced luminance input signal to the frame memory 320. In operation, subtractor 312 produces the difference between the incoming luminance signal and the frame delayed noise reduced luminance signal. Limiter 314 passes this difference if it is small (i.e., there is little or no motion) and the difference signal is added by adder 316 to the input signal Yin. As a result, the input signal Yin is mostly cancelled and replaced by the frame delayed signal. However, when motion is present, the output of the subtractor 312 will be a relatively large signal. Accordingly, limiter 314 will limit the difference signal thereby causing the incoming signal Yin to be used almost exclusively since the difference signal will be limited by limiter 314. For this to occur, limiter 314 has a gain selected to be less than unity when it is not limiting (e.g., the limiter "small signal" gain) so that the memory 320 contents always converges towards the average of the input signal Yin. An exemplary gain for limiter 314 is seven-eighths ($\frac{7}{8}$).

The motion signal in the processor of FIG. 3 is produced in the motion detector and sub-sampling circuit 330 by means of a subtractor 332 that forms the difference between the non-delayed and frame delayed video signals and an absolute value circuit 334 that takes the absolute value of the difference signal. Since the absolute value of the difference is taken, it does not matter whether the delayed signal is subtracted from the non-delayed signal or vice-versa.

The output of the absolute value circuit is next applied to a "sub-sample" circuit 336 of a type which, in this example of the invention, provides the dual features of memory size reduction and horizontal motion spreading. Recall that in the present system the motion signal is of full resolution (e.g., 8-bits) rather than low resolution (e.g., 3 bits) as in conventional systems. Also, in the present system, the motion signal is later subjected to temporal spreading in unit 340 and this involves the use of a frame delay memory. For such a large memory, the increased word width of the full resolution motion signal can represent a cost penalty since a greater number of memory cell locations are required for the higher resolution signal. Advantageously, in the system of FIG. 3, there is a solution to this problem. Specifically, it has been found that little or no loss of performance results if the motion signal for four horizontally adjacent pixels are combined, using the largest frame difference value of the four to represent the motion of the entire group. This operation produces a type of localized horizontal spreading of the motion data and is identified in FIG. 3 by the "subsample" block 336. This may be implemented, for example, by shifting the motion data into a register four bits at a time and applying the data to a magnitude comparator for selecting the greatest of the four data samples to produce the "horizontally spread" motion output signal. Advantageously, the memory required for an 8-bit version of this sub-sampled motion signal is then equivalent to that which would otherwise be required for a 2-bit full rate motion signal. The savings, therefore, amounts to a four-to-one reduction of memory requirements for the subsequent temporal recursive spreading.

The detected and sub-sampled motion signal produced by unit 330 is next applied to a motion signal processor 340. To ensure that motion in the spatially interpolated video signal YS is included, the motion signal is delayed by 262H in unit 342 and by an additional 1-H in delay unit 343 to obtain the motion corresponding to the lines that produce the spatially interpolated signal YS. The smallest of these motion values (262H or 263H) is selected by minimum value selector 346 and is then compared (by maximum value selector 347) with the un-delayed motion signal and the larger of these signals is used as the processed motion output signal MOT.

It has been found that purely temporal recursive motion spreading provides good suppression of motion artifacts. This is done in motion signal processor 340 by delaying the motion signal at the output of 1-H delay 343 by an additional field (262H) in unit 344 producing a total delay of one frame. This frame delayed signal is multiplied by unit 345 by a fraction, less than unity, (e.g., 15/16ths) and the maximum of the attenuated signal and the incoming motion signal is selected by maximum detector 341 for use as the input to the frame delay. This causes the value of the motion signal MOT at a particular pixel to gradually "die out" (e.g., diminish) over a period of several frames after a moving object has passed thereby temporally "spreading" the motion.

RCA 87135

Formation of a motion adapted luminance output signal Y2 is provided by means of an averager 360 which forms a temporally interpolated video signal YT by averaging the un-delayed and frame delayed video signals 0-H and 525H. Another averager 362 forms a spatially interpolated video signal YS by averaging the delayed signals 262H and 263H provided by frame delay memory 320. A subtractor 370 forms a difference signal YS−YT from the temporally and spatially interpolated signals YT and YS. This difference signal YS−YT is then symmetrically limited (or "clipped") in amplitude by means of a median filter 350 in response to the motion signal MOT produced by processor 340 and to the inverse motion signal (−MOT) provided by an inverter 364. The interpolated (or "estimated") output signal Y2 is then formed by combining the motion limited difference signal with the temporal averaged signal YT.

As in the previous example, the symmetrical limiter may be implemented in various ways. For example, one may use a three-input median filter of the conventional type which makes three pair-wise comparisons to provide an output signal corresponding the median of the three input signals. However, as previously explained, it may be simplified to require only two signal comparisons as shown in FIG. 3 since it is known beforehand that the motion signal MOT will always be equal to or greater than the motion signal −MOT. In this example, the median filter comprises a minimum value selector 354 that selects the minimum of the motion signal MOT and the difference signal YS−YT and a maximum value selector 352 that selects the greater of the inverted motion signal −M and the output of the minimum value selector.

A progressive scan video output signal Yout is produced by a pair of time compression circuits 380 and 382 and a multiplex switch 386. To ensure temporal alignment between the non-interpolated video input signal and the interpolated motion compensated signal Y2, the video input signal is delayed by one field by delay 322. The non-interpolated field delayed video signal Y1 and the interpolated motion compensated signal Y2 are both then time compressed by a factor of two-to-one (2:1) in compressors 380 and 382, respectively. After time compression, the processed signals are then interleaved by means of multiplex switch 386 thereby providing a progressive scan video output signal Yout of double the line rate of the input signal and in which every other line thereof corresponds to the video input signal and in which each in-between line thereof is interpolated and subjected to adaptive motion compensation.

In the embodiments of the invention hereinbefore described, it has been seen that the motion compensated output signal is produced by first forming a difference signal from the spatially and temporally interpolated signals, then symmetrically limiting the difference signal as a function of the motion signal and finally combining the limited signal with the temporally interpolated signal.

In FIGS. 2 and 3 examples of the invention are given wherein the difference signal DIFF is obtained by subtracting the temporally interpolated signal YT from the spatially interpolated signal YS and the output signal is produced by addition of the limited signal and the temporally interpolated signal. This, however, is not essential to the practice of the invention. One may, in the alternative, subtract the spatially interpolated signal YS from the temporally interpolated signal YT if one replaces the output adder with a subtractor to subtract the limited difference signal from the temporally interpolated signal YT.

What is claimed is:

1. A motion adaptive video signal processing system comprising:

a video source for providing a temporally interpolated video signal (YT), a spatially interpolated video signal (YS) and a motion indicating signal (MOT); and circuit means for forming a difference signal (DIFF) from said temporally and spatially interpolated signals, for symmetrically limiting the difference signal as a function of the motion signal (MOT) and for combining the resultant symmetrically limited difference signal (Y3) and the temporally interpolated signal (YT) to form a motion adapted video output signal (Y2);

said circuit means including a median filter for symmetrically limiting said difference signal; and said median filter having a first input coupled for receiving said difference signal (DIFF), having a second input coupled for receiving said motion signal (MOT), having a third input coupled for receiving an inverted motion indicating signal (−MOT), and having an output for providing said resultant symmetrically limited difference signal (Y3).

2. A motion adaptive video signal processing system comprising:

a video source for providing a temporally interpolated video signal (YT), a spatially interpolated video signal (YS) and a motion indicating signal (MOT); and circuit means for forming a difference signal (DIFF) from said temporally and spatially interpolated signals, for symmetrically limiting the difference signal as a function of the motion signal (MOT) and for combining the resultant symmetrically limited difference signal (Y3) and the temporally interpolated signal (YT) to form a motion adapted video output signal (Y2); and circuit means for applying at least one of sub-sampling and temporal motion spreading to said motion signal.

3. A motion adaptive video signal processing system comprising:

a video source for providing a temporally interpolated video signal (YT), a spatially interpolated video signal (YS) and a motion indicating signal (MOT); and circuit means for forming a difference signal (DIFF) from said temporally and spatially interpolated signals, for symmetrically limiting the difference signal as a function of the motion signal (MOT) and for combining the resultant symmetrically limited difference signal (Y3) and the temporally interpolated signal (YT) to form a motion adapted video output signal (Y2); and wherein: for symmetrically limiting said difference signal (DIFF) said circuit means includes:

a minimum value selector for selecting the smaller of said difference signal (DIFF) and said motion signal (MOT); and a maximum value selector for selecting the larger of an inverse of said motion signal (−MOT) and the signal selected by said minimum value selector.

4. A motion adaptive video signal processing system comprising:

a video source for providing a temporally interpolated video signal (YT), a spatially interpolated video signal (YS) and a motion indicating signal (MOT); and circuit means for forming a difference signal (DIFF) from said temporally and spatially interpolated signals, for symmetrically limiting the difference signal as a function of the motion signal (MOT) and for combining the resultant symmetrically limited difference signal (Y3) and the temporally interpolated signal (YT) to form a motion adapted video output signal (Y2); wherein said circuit means comprises:

means for inverting said motion signal;

means for subtracting said temporally interpolated signal and said spatially interpolated signal to form said difference signal;

a symmetrical limiter coupled to receive said difference signal and said motion signal to provide said symmetrically limited output signal; and means for combining said temporally interpolated signal with said symmetrically limited output signal to form said motion adapted video output signal.

5. A motion adaptive video signal processing system, comprising:
a video source responsive to a video input signal for providing a temporally interpolated video signal YT, a spatially interpolated video signal YS and a motion indicating signal M;
an output circuit, including a median filter for blending said temporally and spatially interpolated video signals as a function of said motion indicating signal for providing a motion compensated interpolated video output signal;
a first frame recursive filter coupled to said source for applying noise reduction to said video input signal; and
a second frame recursive filter coupled to said source for applying temporal motion spreading to said motion indicating signal.

6. A motion adaptive video signal processing system as recited in claim 5 wherein:
said motion indicating signal comprises a digital signal of relatively high resolution and further comprising:
a sub-sampling circuit for selecting the largest one of every N samples of said motion indicating signal for application to an input of said second frame recursive filter.

7. A motion compensated video signal processing system, comprising:
a first frame recursive filter having an input for receiving a video input signal and having outputs providing a non-delayed video signal, a temporally averaged video signal, a spatially averaged video signal and a frame delayed video signal;
a motion detector responsive to said non-delayed and frame delayed signals for providing a motion indicating signal;
circuit means for applying sub-sampling to said motion indicating signal;
a second frame recursive filter for applying temporal spreading to said motion indicating signal; and
output means including a symmetrical limiter responsive to said motion indicating signal for forming a motion compensated video output signal from said temporally and spatially averaged video signals.

8. A progressive scan processor, comprising:
a video input signal processor responsive to a video input signal (Yin) for providing a field delayed video signal (Y1), a temporally interpolated video signal (YT), a spatially interpolated video signal (YS) and a motion indicating signal (M);
circuit means for forming a difference signal (DIFF) from said temporally and spatially interpolated signals (YT, YS), for symmetrically limiting the difference signal (DIFF) in accordance with the motion signal (M) and for combining the resultant limited signal with the temporally interpolated signal (YT) to form a motion compensated video signal (Y2) and;
output means for time compressing and interleaving said field delayed video input signal (Y1) and said motion adapted video output signal (Y2) to form a progressive scan video output signal (Yout); and
wherein said circuit means comprises:

a subtractor to which said temporally and spatially interpolated signals (YT, YS) are applied for forming said difference signal (DIFF);
a symmetrical limiter having a first input coupled to receive said difference signal (DIFF), having a second input coupled to receive said motion signal (MOT) and having a third input coupled to receive an inverted motion signal (−MOT) for providing said symmetrically limited difference signal (Y3); and
a combiner for combining said symmetrically limited difference signal (Y3) with said temporally interpolated video signal (YT) to form said motion compensated video signal (Y2).

9. A motion compensated video signal processor, comprising:
a video source for providing a temporally interpolated video signal YT, a spatially interpolated video signal YS and a motion indicating signal M; and
a signal blending circuit comprising:
a subtractor for forming a difference signal (DIFF) from the temporally and spatially interpolated signals (YT, YS);
a median filter for symmetrically limiting the difference signal (DIFF) in accordance with the motion indicating signal (M) to form a symmetrically limited difference signal (Y3); and
a combiner for combining the symmetrically limited difference signal (Y3) with the temporally interpolated signal (YT) to form a motion compensated video output signal (Y2).

10. A motion compensated video signal processor as recited in claim 9 wherein:
said motion indicating signal is a digital signal of relatively high resolution and further comprising:
circuit means coupled between said source and said median filter for applying sub-sampling and temporal motion spreading to said motion indicating signal.

11. A method for motion compensating a video signal, comprising:
providing a temporally interpolated video signal (YT), a spatially interpolated video signal (YS) and a motion indicating signal (MOT);
forming a difference signal (DIFF) from the interpolated signals (YT, YS);
symmetrically limiting the difference signal (DIFF) in accordance with the motion signal (MOT) to form a symmetrically limited difference signal (Y3); and
combining the symmetrically limited difference signal (Y3) with the temporally interpolated signal (YT) to form a motion compensated video output signal (Y2).

12. A method as recited in claim 11 further comprising the step of applying at least one of sub-sampling and temporal motion spreading to said motion signal.

13. A method as recited in claim 11 wherein the step of symmetrically limiting said difference signal (DIFF) comprises:
applying said difference signal (DIFF) to a first input of a median filter;
applying said motion signal (MOT) to a second input of said median filter;
inverting said motion signal to form an inverted motion signal (−MOT);
and applying said inverted motion signal to a third input of said median filter for producing said symmetrically limited difference signal (Y3) at an output of said median filter.

* * * * *